Nov. 9, 1948. O. M. TWEIT Re. 23,048

WASH BOX

Original Filed June 7, 1940

INVENTOR
Otar M. Tweit
BY
Benjamin Sewell Orr
ATTORNEY

Reissued Nov. 9, 1948 Re. 23,048

UNITED STATES PATENT OFFICE 23,048

WASH BOX

Olav M. Tweit, Mountain Lakes, N. J., assignor to Allied Chemical & Dye Corporation, a corporation of New York Original No. 2,373,519, dated April 10, 1945, Serial No. 339,360, June 7, 1940. Application for reissue June 29, 1948, Serial No. 35,909

10 Claims. (Cl. 261—8)

Figures 1, 2:
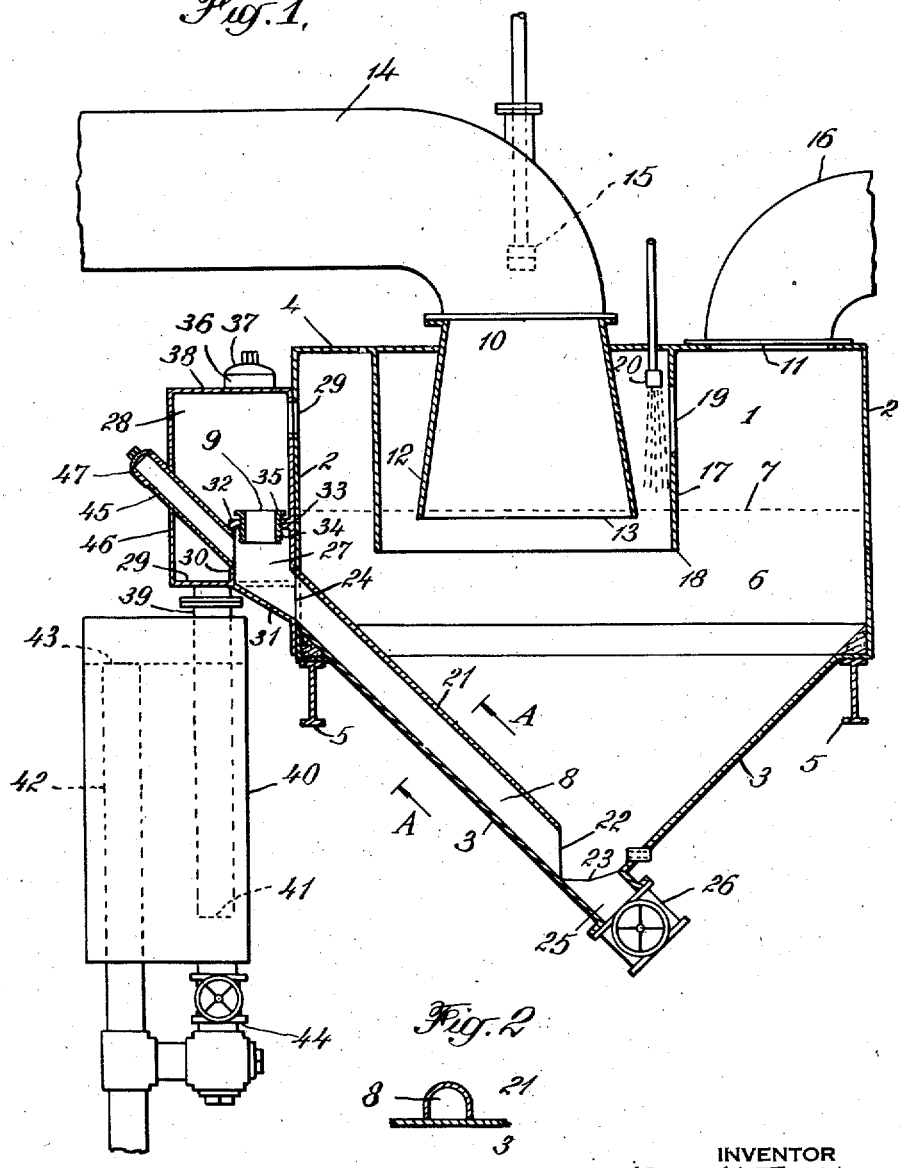

This invention relates to washboxes or water seals of the type generally utilized in equipment employed in the production of combustible gas, for example, apparatus for the manufacture of blue gas or carbureted water gas. Carbureted water gas sets usually involve a generator, carburetor, superheater and washbox connected in series, the latter unit of the set serving in part to remove tar and other products carried over by the gas passing therethrough and in part as a seal to prevent return of gas from the main to the superheater or generator.

It has been proposed to employ washboxes having inclined bottoms along which the tar and similar products separated from the gas flow down to the lowest point of the washbox, where they may be drained off into a seal pot or a separate seal pipe to be disposed of in any suitable manner. This type of washbox has been found to be reasonably satisfactory and efficient in operation in the production of carbureted water gas in which gas oil or other light oils may be used as the carbureting media, thereby resulting in the formation of tars of a relatively free-flowing type which can be readily handled. In recent years, however, the utilization of gas oils and other light oils as carbureting media in carbureted water gas making processes has been replaced to a very great extent by the use of crude heavy oil such as bunker oil or residuum, which materials result in the production of viscous tars. Such tars in the presence of an aqueous medium tend to solidify and form emulsions and gummy masses difficult to handle. In water gas sets employing heavy oils as the carbureting media it has been found that gummy tarry masses settle at the bottom of the inclined bottom washboxes heretofore used, seriously interfering with normal operation of the washbox, so that frequent interruptions of the operation of the set to permit the removal of such masses from the washbox are necessary.

It is an object of this invention to provide a washbox of improved design which is particularly adapted for use in water gas sets employing heavy oil as the carbureting medium, and which provides for the continuous removal of tar and suspended material separated from the gas from the washbox, thereby minimizing, if not eliminating, the deposit and solidification of such material within the washbox. While, as above indicated, the washbox of this invention is particularly designed for use in water gas sets employing heavy oils as the carbureting media, it can be used with advantage in gas generating sets employing gas oil as the carbureting medium or in other gas generating equipment.

A further object of the invention is to provide a washbox of simple construction, the parts of which are readily accessible for cleaning.

In connection with the manufacture of gas in gas retorts it has been proposed to provide at the outlet of the hydraulic main a vertical baffle or hood in such manner that the heavier tar is removed from the bottoms of the main. My invention is distinguished from such prior art in that it concerns washboxes for use in connection with blue gas or carbureted water gas manufacture, and it possesses the advantages that it not only provides for simplified cleaning of the apparatus but accomplishes more effective removal of tar at lower liquid velocities than accomplished by the prior art structures.

According to my invention I provide a washbox having a sloping bottom constructed and arranged to cause tarry matter settling toward the bottom to collect at a localized point, and an inclined internal discharge conduit extending upwardly along the sloping bottom so that the walls thereof are in direct contact throughout its length with wash liquid in the washbox. The inlet of this conduit is disposed adjacent said localized point. By this arrangement tar and other matter washed from the gas settle along the sloping bottom to the apex thereof, are promptly carried from the washbox by the overflowing wash liquid into and through the discharge conduit, and are discharged with the wash liquid. As the tar and other material passing through the discharge conduit are maintained at a relatively high temperature, due to the indirect heat exchange between the tar and other material passing through the conduit and the hot tar and aqueous material in the washbox which have been heated by the hot gas escaping through the washbox, solidification of tar and other material on the walls of the conduit is minimized if not prevented. Further, the washbox is so designed that a clean-out opening is disposed in alignment with the discharge conduit. A clean-out tool may be inserted through this opening without interrupting the operation of the water gas set to break up and effect removal of deposits in the lowest portion of the washbox or on the walls of the discharge conduit.

Other objects and advantages of this invention will appear from the following detailed description taken in connection with the accompanying drawings, in which Figure 1 is a side elevation partly in section of a washbox constructed in accordance with this invention, and Figure 2 is a detail sectional view taken on the line A—A of Figure 1.

Fig. 1 shows a washbox adapted for use with a carbureted water gas set, and the present description will be confined to the present illustrated embodiment of the invention. It will be understood, however, that the novel features and improvement are susceptible to other applications such as washboxes for use with blue gas sets. Hence, the scope of this invention is not confined to the embodiment herein described.

The washbox comprises a receptacle, indicated generally at 1, constituted of a cylindrical wall 2, a conical bottom 3 and a cover 4. The receptacle is supported by I-beams 5 positioned, as shown in Fig. 1, beneath the conical bottom 3 adjacent its point of junction with the cylindrical wall. A body of wash liquid 6 is maintained in the receptacle with its surface kept at a predetermined level 7 by overflow through discharge conduit 8 and overflow leveling device 9 described below. The cover 4 of the washbox is provided with an inlet opening 10, an outlet opening 11 and a circular skirt or dip pipe 12 mounted in the inlet opening 10 and having its lower edge 13 immersed in the body of wash liquid 6. Gas from the superheater of a carbureted water gas set (not shown) passes through pipe 14, wherein it is sprayed by the spray 15, to dip pipe 12, under the edge 13 of the dip pipe, where it is washed by contact with the wash liquid, and leaves the washbox through outlet 11 and discharge pipe 16. A circular baffle 17 fixed, for example, by welding, to cover 4 concentric with dip pipe 12 has its lower edge 18 immersed in the wash liquid and is provided above the liquid level with an opening 19 through which the washed gas from dip pipe 12 passes. The spray 20, also mounted on the cover 4 and so placed as to contact the gas about to pass through opening 19, subjects the gas to an additional washing.

Discharge conduit 8 is formed on the conical bottom 3 by fixing thereto, for example, by welding, a sheet of metal 21 of U-shaped cross-section, as shown in Fig. 2. The open lower end 22 of the conduit 8 is adjacent the apex 23 of the conical bottom 3, and the conduit extends upwardly along the conical bottom in contact with the liquid in the washbox throughout its length and has its upper end sealed to the cylindrical wall 2 with its edges coinciding with the edges of the opening 24 in the wall 2. The tar and other matter washed from the gas settle along the conical bottom 3, become concentrated near the apex 23 and, together with overflow wash liquid, enter the open end 22 of the conduit, flow upwardly therethrough and discharge through opening 24 into overflow leveling device 9 affixed to the outside of wall 2. The liquid in the washbox becomes heated in washing the hot gases and maintains the conduit 8 with which it is in contact at such a temperature that solidification of the tar on the walls of the conduit is retarded or prevented.

The apex 23 of the conical bottom is fitted with a section of pipe 25 and a valve 26 to permit draining of the receptacle when desired.

The overflow device, indicated generally at 9, through which the matter from conduit 8 is discharged and which governs the level 7 of liquid in the washbox, is fixed to the outside of cylindrical wall 2 and comprises a chamber 27 constituting a continuation of conduit 8 outside the receptacle, and a chamber 28 surrounding the chamber 27 and communicating with receptacle 1 through opening 29 in the wall 2 of the receptacle above the level 7 of liquid therein. The chamber 27 comprises an outer wall 30, a bottom wall 31 and a top wall 32. A screw-threaded opening 33 in the top wall 32 is fitted with a short, threaded section of pipe 34 adjustable to be raised and lowered by turning the same so that the height of its upper edge 35 may be varied at will. When the level 7 of the surface of liquid in the receptacle 1 is above the height of the edge 35, liquid will be forced through conduit 8 into chamber 27 and discharged over the edge 35 of the pipe. By adjusting the height of the edge 35 the level of liquid in the receptacle is controlled. The pressure in chamber 28 will be equalized with the pressure in the receptacle 1 through opening 29, and accordingly change of gas pressure within the receptacle does not affect the functioning of the overflow device 9.

An opening 36, sealed during operation of the washbox by cap 37, is provided in the top wall 38 of chamber 28 to permit adjustment of the pipe 34 and inspection and cleaning of chamber 28.

The liquid overflowing the edge 35 of pipe 34 of the overflow device 9 falls to the bottom of the chamber 28 and is discharged through pipe 39 into a seal pot 40. The tar carried with the liquid discharged through pipe 39 settles to the bottom of the seal pot 40 and may be withdrawn therefrom as desired. The lower end 41 of pipe 39 is immersed in the liquid in seal pot 40 to a depth such that the column of liquid from the lower end 41 of pipe 39 to the surface of the liquid in the seal pot will balance any gas pressure which might be reached in receptacle 1 or chamber 28 and prevent escape of gas from receptacle 1 through chamber 28 and pipe 39, while permitting discharge of liquid from the chamber 28. A discharge pipe 42 is provided within the seal pot 40 with its open upper end 43 at the level at which it is desired to maintain the surface of the liquid in the seal pot. A valve-controlled discharge 44 is provided to permit draining of the seal pot when desired.

A pipe 45 communicating with conduit 8 through the chamber 27 is fixed to the wall 30 of the chamber and extends in alignment with conduit 8 upwardly through the side wall 46 of chamber 28, terminating at a point above the upper edge 35 of the overflow pipe 34 and, therefore, above the level 7 of liquid in the receptacle. A removable closure device 47 is provided at the upper end of the pipe. When the closure 47 is removed a cleaning tool may be inserted through the open end of the pipe 45 to clean the conduit 8 and the apex 23 of the conical bottom 3. Since the upper end of the pipe 45 is above the liquid level in the receptacle and the lower end is below the liquid level, neither gas nor liquid can escape during cleaning, and it is not necessary to empty the receptacle before cleaning.

The washbox forming the subject of the present invention provides a dependable water seal and means for washing gas in which tar washed from the gas does not accumulate and solidify. As a result of this feature of the washbox the hitherto necessary shutting down of the gas set and the difficulties involved in removing solidified tar from the washbox are avoided. The washbox is simple in design and its interior is accessible through an opening in alignment with the discharge conduit above the liquid level therein to permit removal of deposits in the apex part of the conical bottom or on the walls of the discharge conduit without interfering with the normal operation of the gas set.

Since the different embodiments of the invention may be made without departing from the scope of this invention, it is intended that all matter contained in the above description or shown in the accompanying drawing shall be interpreted as illustrative and not in a limiting sense.

I claim:

1. A washbox for gas generators comprising a receptacle having a gas inlet, a gas outlet and a conical bottom, sealing means in the receptacle to prevent passage of gas from the gas outlet to the gas inlet, means for supplying liquid to said washbox to wash gas flowing therethrough and remove tar and suspended material from said gas, the wash liquid and tar thus removed collecting in said receptacle, means for maintaining the level of liquid in said receptacle comprising a pressure-equalizing chamber communicating with said receptacle above the level of liquid therein and a discharge conduit with its inlet adjacent the apex of the conical bottom of the receptacle to receive said wash liquid and tarry matter and with its outlet opening in said pressure-equalizing chamber at a level corresponding to the liquid level in the receptacle, and a pipe communicating with the conduit below the level of liquid therein and having its upper end above the level of the liquid, the pipe and conduit being constructed and arranged so that a tool may be introduced through the pipe to clean the conduit and the apex of the conical bottom of the receptacle.

2. A washbox for gas generators comprising a receptacle having a gas inlet, a gas outlet and a conical bottom, a body of wash liquid within the receptacle, a gas-liquid contacting device communicating with the gas inlet and comprising a dip pipe having its lower end immersed in the wash liquid, a spray of wash liquid to wash gas flowing through the washbox and remove tar and suspended material from said gas, the wash liquid and tar thus removed collecting in said receptacle, means to maintain the level of liquid in the receptacle comprising a pressure-equalizing chamber communicating with the receptacle above the level of liquid therein and an upwardly extending overflow and discharge conduit with its inlet adjacent the apex of the conical bottom of the receptacle to receive overflow wash liquid containing tarry matter, and with its outlet opening in said pressure-equalizing chamber at a level corresponding to the liquid level in the receptacle, and a pipe communicating with the conduit below the level of liquid therein and having its upper end above the level of the liquid, the pipe extending in alignment with the conduit through the pressure-equalizing chamber to the atmosphere and being constructed and arranged so that means may be introduced through it to clean the conduit and the apex of the conical bottom of the receptacle.

3. A washbox for gas generators comprising a receptacle having a gas inlet, a gas outlet and a conical bottom, a body of wash liquid within the receptacle, a spray of wash liquid to wash gas flowing through the washbox and remove tar and suspended material from said gas, the wash liquid and tar thus removed collecting in said receptacle, means to maintain the level of liquid in the receptacle comprising a pressure equalizing chamber communicating with the receptacle above the level of liquid therein, and an overflow and discharge conduit with its inlet adjacent the apex of the conical bottom of the receptacle to receive overflow wash liquid containing tar and with its outlet opening in said pressure-equalizing chamber at a level corresponding to the liquid level in the receptacle, the conduit being disposed in contact with the body of wash liquid throughout substantially its entire length, and a pipe communicating with the conduit below the level of liquid therein and having its upper end above the level of liquid, the pipe and conduit being constructed and arranged so that means may be introduced through the pipe to clean the conduit and the apex of the conical bottom of the receptacle.

4. A washbox for gas generators comprising a receptacle having a gas inlet, a gas outlet, and a conical bottom, a body wash liquid within the receptacle, a dip pipe communicating with the gas inlet and having its lower end immersed in the body of wash liquid to wash the gas and remove tar and suspended matter from the gas, means to maintan the level of liquid in the receptacle comprising a pressure-equalizing chamber communicating with the receptacle above the level of liquid therein and an upwardly extending overflow and discharge conduit formed on the conical bottom of the receptacle with its inlet adjacent the apex of the conical bottom of the receptacle to receive overflow wash liquid containing tar removed from the gas, and with its outlet opening in said pressure-equalizing chamber at the level of the liquid in the receptacle, and a pipe communicating with the conduit at a point below the liquid level therein and extending above the liquid level, the pipe being constructed and arranged to give access to the conduit and apex of the conical bottom.

5. A washbox comprising a receptacle having an inlet and an outlet for gas passing through the washbox, a bottom sloping downwardly from the periphery of the receptacle on which bottom is maintained a body wash liquid through which tarry matter can settle and collect at a localized point on the said bottom, sealing means in the receptacle to prevent passage of gas from the gas outlet to the gas inlet, an inclined internal liquid overflow and discharge conduit disposed along said sloping bottom and with its inlet adjacent said localized point, and a single liquid seal for the washbox, said seal communicating with the outlet of said liquid overflow discharge conduit.

6. A washbox for gas generators comprising a receptacle having an inlet and an outlet for gas passing through the washbox, means for introducing liquid into said receptacle to form a body of wash liquid therein, means for passing gas through the wash liquid to remove tarry matter from the gas, said receptacle having a sloping bottom constructed and arranged to cause tarry matter settling toward the bottom to collect at a localized point, an inclined internal overflow and discharge conduit disposed along said sloping bottom in heat-exchange relation with the body of wash liquid and with its inlet disposed adjacent said localized point, sealing means in the receptacle to prevent passage of gas from the gas outlet to the gas inlet, a single liquid seal communicating with the outlet of said internal overflow and discharge conduit, said bottom, internal liquid overflow and discharge conduit and seal being constructed and arranged so that throughout the flow of gas through the washbox tarry matter settles at the said localized point and flows through the internal overflow and discharge conduit into said seal.

7. A washbox for gas generators comprising a receptacle adapted to contain a body of wash liquid, means for spraying liquid into said receptacle, means for passing gas through said spray to wash tarry matter from the gas, said receptacle having a bottom sloping downwardly from its periphery toward its center so that tarry matter removed from the gas settles through said body of wash liquid to the bottom and collects at a localized point, sealing means in the receptacle to prevent passage of gas from the gas outlet to the gas inlet, an inclined internal overflow and discharge conduit disposed along said sloping bottom in heat-exchange relation with the body of wash liquid and with its inlet disposed adjacent to said point and its outlet disposed outside of the receptacle, said conduit serving to carry away said wash liquid and tarry matter, and a liquid seal with which the outlet of said overflow and discharge conduit communicates.

8. A washbox for gas generators comprising a receptacle having a gas inlet, a gas outlet and a conical bottom, a body of wash liquid within the receptacle through which the gas passes thereby removing tar and suspended matter from the gas, means for continuously supplying fresh wash liquid to the receptacle, sealing means in the receptacle to prevent passage of gas from the gas outlet to the gas inlet, an inclined internal liquid overflow and discharge conduit disposed along said conical bottom and having its inlet adjacent to the apex of the bottom of the receptacle and its outlet outside of the receptacle, to receive and conduct away wash liquid containing tarry matter, a liquid seal communicating with the outlet of said conduit, and means for maintaining gas pressure at the said outlet of the discharge conduit substantially equal to that within the receptacle so that substantially continuous discharge of tar and suspended matter removed from the gas and settling to said apex takes place through said conduit throughout the passage of gas through said washbox.

9. A washbox for gas generators comprising a receptacle having a gas inlet, a gas outlet, and a conical bottom and adapted to contain a body of wash liquid through which the gas passes and which effects removal of tar and suspended matter from the gas, means for supplying fresh wash liquid to the receptacle, sealing means in the receptacle to prevent passage of gas from the gas outlet to the gas inlet, means to maintain the level of liquid in the receptacle comprising a pressure-equalizing chamber communicating with the receptacle above the level of liquid therein and a substantially straight inclined internal liquid overflow and discharge conduit disposed along said conical bottom and having its inlet adjacent to the apex of the conical bottom of the receptacle to receive wash liquid containing tarry matter and having its outlet opening into said pressure-equalizing chamber so that substantially continuous discharge of tar and suspended matter settling through the body of wash liquid to the apex of said conical bottom takes place through said upwardly extending liquid overflow and discharge conduit throughout the flow of gas through the washbox, and a sealpot communicating with said pressure-equalizing chamber for flow of tar and suspended matter thereinto from the pressure-equalizing chamber.

10. A washbox for gas generators comprising in combination, a receptacle having an inlet and outlet for gas passing therethrough, said receptacle having a conical bottom with the apex of the cone forming the base portion of said receptacle, said conical bottom adapted to contain a body of wash liquid, and an internal discharge conduit having its inlet disposed adjacent to the apex of said conical bottom and extending upwardly along said conical bottom in contact with the liquid thereon and arranged to discharge wash liquid and tarry matter which collects at the apex of said conical bottom.

OLAV M. TWEIT.

REFERENCES CITED

The following references are of record in the file of this patent:

FOREIGN PATENTS

| Number | Country | Date |
|---|---|---|
| 12,990 | Great Britain | July 3, 1893 |